US 12,116,921 B2

(12) United States Patent
Shimizu et al.

(10) Patent No.: US 12,116,921 B2
(45) Date of Patent: Oct. 15, 2024

(54) MIXING DEVICE

(71) Applicant: TOKYO ROKI CO., LTD., Yokohama (JP)

(72) Inventors: Masaki Shimizu, Yokohami (JP); Jun Kichiya, Yokohami (JP); Takuma Baba, Yokohami (JP)

(73) Assignee: TOKYO ROKI CO., LTD., Yokohama (JP)

( * ) Notice: Subject to any disclaimer, the term of this patent is extended or adjusted under 35 U.S.C. 154(b) by 0 days.

(21) Appl. No.: 18/035,071

(22) PCT Filed: Nov. 4, 2020

(86) PCT No.: PCT/JP2020/041203
§ 371 (c)(1),
(2) Date: Aug. 15, 2023

(87) PCT Pub. No.: WO2022/097198
PCT Pub. Date: May 12, 2022

(65) Prior Publication Data
US 2024/0011424 A1   Jan. 11, 2024

(51) Int. Cl.
*F01N 3/28* (2006.01)
*F01N 3/035* (2006.01)
(Continued)

(52) U.S. Cl.
CPC ........... *F01N 3/2892* (2013.01); *F01N 3/035* (2013.01); *F01N 3/2066* (2013.01);
(Continued)

(58) Field of Classification Search
CPC ..... Y02T 10/12; F01N 13/0097; F01N 13/08; F01N 2430/00; F01N 2470/20; F01N 3/021; F01N 3/035; F01N 3/2066; F01N 3/2892
See application file for complete search history.

(56) References Cited

U.S. PATENT DOCUMENTS

| 2009/0158717 A1 | 6/2009 | Kimura et al. |
| 2010/0083643 A1 | 4/2010 | Hayashi et al. |

(Continued)

FOREIGN PATENT DOCUMENTS

| DE | 102015106876 A1 | 11/2015 |
| DE | 102016014966 | * 6/2018 |

(Continued)

OTHER PUBLICATIONS

Extended European search report dated Jun. 11, 2024.

*Primary Examiner* — Phutthiwat Wongwian
*Assistant Examiner* — Diem T Tran
(74) *Attorney, Agent, or Firm* — Harness, Dickey & Pierce, P.L.C.

(57) ABSTRACT

A mixing device includes a case surrounding a blowing section of a filter or a catalyst; an upper pipe segment having an opening facing a direction opposite to the blowing section and tilted relative to the vertical direction so that the more the upper pipe segment goes vertically downward, the closer it gets to the blowing section; a lower pipe segment bent from a lower end of the upper pipe segment and tilted relative to the vertical direction so that the more it goes vertically downward, the further away it gets from the blowing section, the lower pipe segment extending out from the case and connected to a selective catalytic reduction device; and an injector attached to the case and injecting a liquid additive toward an area faced by the opening, the area being located outside the upper pipe segment in the case.

4 Claims, 6 Drawing Sheets

(51) Int. Cl.
  *F01N 3/20* (2006.01)
  *F01N 13/00* (2010.01)
  *F01N 13/08* (2010.01)

(52) U.S. Cl.
  CPC ......... *F01N 13/0097* (2014.06); *F01N 13/08* (2013.01); *F01N 2430/00* (2013.01); *F01N 2470/20* (2013.01)

(56) References Cited

U.S. PATENT DOCUMENTS

| | | |
|---|---|---|
| 2015/0020484 A1 | 1/2015 | Kimura |
| 2015/0275728 A1 | 10/2015 | Braun et al. |
| 2019/0063293 A1 | 2/2019 | Fischer et al. |
| 2020/0080457 A1* | 3/2020 | Kontin ................. F01N 3/2066 |
| 2021/0108548 A1 | 4/2021 | Mayumi et al. |

FOREIGN PATENT DOCUMENTS

| | | |
|---|---|---|
| JP | 2009156073 A | 7/2009 |
| JP | 2013142368 A | 7/2013 |
| JP | 6077665 B2 | 2/2017 |
| JP | 2018173018 A | 11/2018 |

* cited by examiner

MIXING DEVICE

CROSS-REFERENCE TO RELATED APPLICATIONS

This application is a 371 U.S. National Phase of International Application No. PCT/JP2020/041203, filed on Nov. 4, 2020. The entire disclosure of the above application is incorporated herein by reference.

TECHNICAL FIELD

The present invention relates to mixing device installed upstream of a selective catalytic reduction device to mix exhaust gas and additives.

BACKGROUND ART

To reduce nitrogen oxides in the exhaust gas emitted from diesel engines, selective catalytic reduction devices that selectively reduce nitrogen oxides using a catalyst are employed in the exhaust system of diesel engines. Catalysts are used to preferentially reduce nitrogen oxides over oxygen and other substances. For the reduction of nitrogen oxides, a reductant such as an aqueous urea solution is added to a stream of exhaust gas upstream of the selective catalytic reduction device. Furthermore, to increase the efficiency of the reduction of nitrogen oxides, the additive needs to be vaporized before reaching the selective catalytic reduction device, and ammonia needs to be produced by hydrolysis or thermal decomposition of the gaseous additive, or both. Patent document 1 discloses a technique for increasing the efficiency of the vaporization and decomposition of additives. The technique described in Patent document 1 is briefly explained below with the reference numbers applied to the components described in Patent document 1 indicated in parentheses.

Exhaust gas discharged from an internal combustion engine flows into a first exhaust gas aftertreatment element (3), and then passes through an oxidation catalytic converter (11) of the exhaust gas aftertreatment element (3). A first exhaust gas duct element (13), which serves as a discharge chute for the oxidation catalytic converter 11, is provided downstream of the exhaust gas aftertreatment element (3). The virtual plane defined by an inlet opening (15) in the first exhaust gas duct element (13) is parallel to the direction of flow of the exhaust gas flowing from the oxidation catalytic converter (11) to the first exhaust gas duct element (13). The virtual plane defined by an outlet opening (17) in the first exhaust gas duct element (13) is perpendicular to the virtual plane defined by the inlet opening (15). An overflow pipe (21) is housed in the first exhaust gas duct element (13). The longitudinal axis of the overflow pipe (21) is perpendicular to parallel to the direction of flow of the exhaust gas flowing from the oxidation catalytic converter (11) to the first exhaust gas duct element (13), and is also perpendicular to the virtual plane defined by the outlet opening (17) of the first exhaust gas duct element (13). An inflow opening (31) is formed in the outer circumferential surface of the overflow pipe (21), on the side opposite to the inlet opening (15). Therefore, exhaust gas flowing into the first exhaust gas duct element (13) from the oxidation catalytic converter (11) passes through the side of the overflow pipe (21), goes around the back of the overflow pipe (21), and flows into the overflow pipe (21) through the inflow opening (31). An injector unit (35) is provided outside the overflow pipe (21) and above a flow chamber (45) placed in front of the inflow opening (31). The injector unit (35) injects a liquid additive in a direction parallel to the longitudinal axis of the overflow pipe (21). Droplets of the additive collide with baffle plates (51, 51', 51") in the flow chamber (45) and are broken up into smaller droplets.

The overflow pipe (21) extends out of the first exhaust gas duct element (13) through its outlet opening (17) and is connected to an exhaust gas pipe (29) at a position located outside the first exhaust gas duct element (13). The exhaust gas pipe (29) is connected to a second exhaust gas aftertreatment element (9) containing a catalytic converter 39 for the selective catalytic reaction. Thus, exhaust gas containing a reductant flows into the second exhaust gas aftertreatment element (9).

RELATED ART DOCUMENT

[Patent Document]
[Patent document 1] JP6077665(B)

SUMMARY OF THE INVENTION

Problems to be Solved by the Invention

In the technique described in Patent document 1, when exhaust gas flows into the overflow pipe (21) from the flow chamber (45) through the inflow opening (31), droplets in the exhaust gas collide with the inner circumferential surface of the overflow pipe (21), particularly on a portion facing the inflow opening (31). Subsequently, a liquid film is formed on the inner circumferential surface of the overflow pipe (21). Such a liquid film flows down along the inner circumferential surface of the overflow pipe (21), resulting in the flow of the liquid additive into the second exhaust gas aftertreatment element (9). This may cause the precipitation of the additive before vaporization, at an unexpected position.

The present invention was made in view of these circumstances, and thus it is an object of the present invention to facilitate the vaporization of additives added upstream of the selective catalytic reduction device and to suppress their precipitation.

Means to Solve the Problem

In order to solve the aforementioned problems, a mixing device includes: a case surrounding a blowing section, through which an exhaust gas is blown out, of a filter or a catalyst; an upper pipe segment having an opening formed therein, the opening facing a direction facing the blowing section, the upper pipe segment being tilted relative to the vertical direction so that the more the upper pipe segment goes vertically downward, the closer it gets to the blowing section in a region facing the blowing section within the case; a lower pipe segment bent from a lower end of the upper pipe segment, the lower pipe segment being tilted relative to the vertical direction so that the more the lower pipe segment goes vertically downward, the further away it gets from the blowing section, the lower pipe segment extending out from the case and being connected to a selective catalytic reduction device; and an injector attached to the case, the injector injecting a liquid additive toward an area faced by the opening, the area being located outside the upper pipe segment in the case.

Droplets of additive(s) injected by the injector are carried by a stream of exhaust gas and move into the upper pipe segment through the opening. These droplets collide with the inner circumferential surface of the upper pipe segment, particularly on a portion located opposite to the opening. Thus, a liquid film of the additive(s) is formed on the inner circumferential surface of the upper pipe segment. Because the upper pipe segment is tilted relative to the vertical direction, the liquid film formed on the inner circumferential surface of the upper pipe segment is less likely to flow downward and is tends to remain on the portion located opposite to the opening. Even if the liquid film flows downward along the inner circumferential surface of the upper pipe segment, it tends to remain in a bent portion between the upper pipe segment and the lower pipe segment. The upper pipe segment and the bent portion are easily heated by the exhaust gas blown out through the blowing section of the filter or catalyst; hence, the liquid film is more likely to vaporize. Therefore, precipitation of additives can be suppressed.

Effects of the Invention

Additives are more likely to vaporize and their precipitation can be suppressed.

EMBODIMENTS FOR CARRYING OUT THE INVENTION

Embodiments are described below with reference to the drawings. The embodiments described below have various technically preferred limitations; however, the scope of the present invention is not limited to the following embodiments and illustrated examples.

Figure 1:
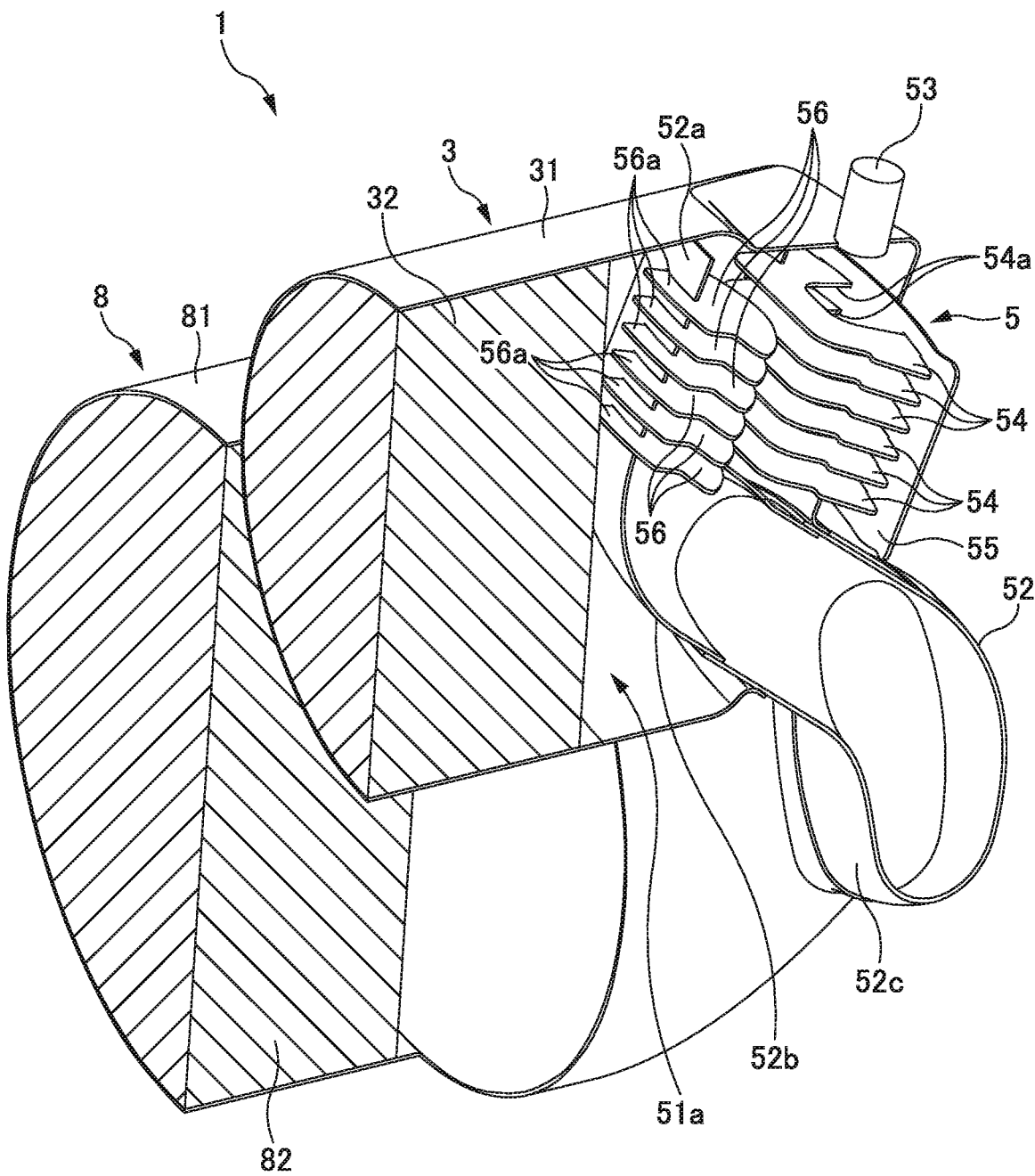
FIG. 1 depicts a schematic perspective view of an exhaust gas purification device equipped with a mixing device.
Figure 2:
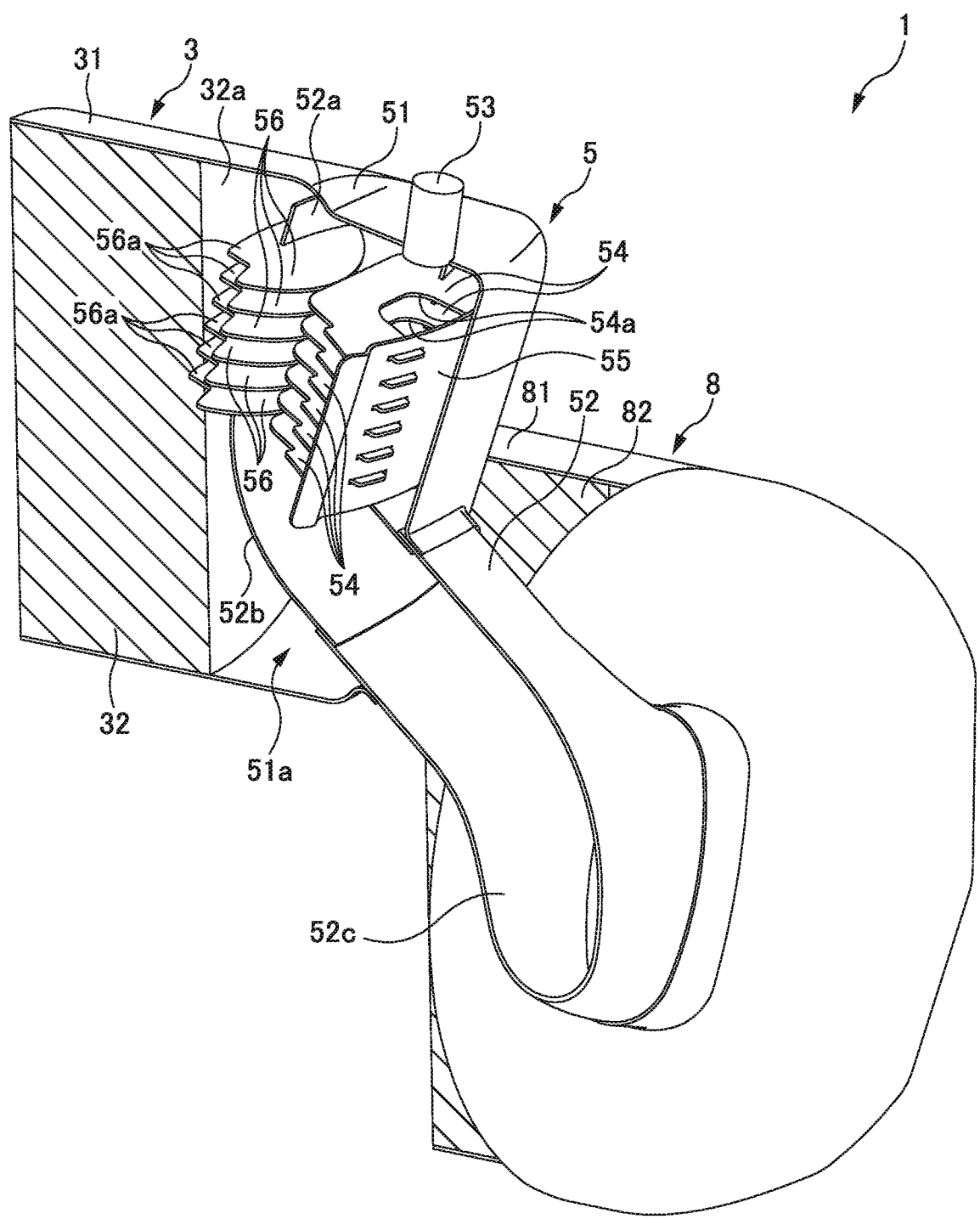
FIG. 2 depicts a schematic perspective view the exhaust gas purification device.

FIGS. 1 and 2 depict schematic perspective views of an exhaust gas purification device 1. In FIGS. 1 and 2, the exhaust gas purification device 1 is shown in a cutaway perspective along the vertical plane. The exhaust gas purification device 1 is connected to the rear end of an internal combustion engine, especially a diesel engine, and purifies the exhaust gas that flows into it from the diesel engine.

The exhaust gas purification device 1 comprises a diesel oxidation catalyst device, a diesel particulate filter device 3, a mixing device 5, and a selective catalytic reduction (SCR) device 8, in the order from upstream to downstream of the flow of the exhaust gas. Exhaust gas discharged from an internal combustion engine passes through the diesel oxidation catalyst device, the diesel particulate filter device 3, the mixing device 5, and the SCR device 8, in this order.

The diesel oxidation catalyst device comprises a diesel oxidation catalyst (DOC) with catalytic components made of platinum-group metals (e.g., platinum, ruthenium, rhodium, palladium, osmium, and iridium) supported on a carrier, and a container in which the DOC is housed. The diesel oxidation catalyst device oxidizes unburned components (e.g., carbon monoxide, hydrocarbons, and carbon monoxide) in the exhaust gas. Such oxidation produces carbon dioxide, hydrogen, and nitrogen dioxide, among other components.

The diesel particulate filter device 3 captures the particulate matter contained in the exhaust gas flowing from the diesel oxidation catalyst device to the diesel particulate filter device 3. The diesel particulate filter device 3 may have a regeneration function to oxidize the captured particulate matter.

The diesel particulate filter device 3 comprises a cylindrical case 31 and a filter 32. The filter 32 is a diesel particulate filter (DPF) with a honeycomb structure. The filter 32 is housed in the case 31, and the outer circumferential surface of the filter 32 is in contact with the inner circumferential surface of the case 31. A catalyst made of a platinum-group or similar metal may be supported on the filter 32 to achieve the regeneration function of the diesel particulate filter device 3. In FIG. 1, the case 31 and filter 32 are illustrated in a cutaway perspective along the vertical plane.

The mixing device 5 adds one or more liquid additives to the exhaust gas flowing from the diesel particulate filter device 3 to the mixing device 5, and vaporizes the additive(s). Examples of additives include an aqueous urea solution, an aqueous ammonia solution or anhydrous ammonia, or a mixture of two or more of them. The additive(s) is/are converted to ammonia (NH 3) via thermal decomposition or hydrolysis, or both. Therefore, the exhaust gas flowing from the mixing device 5 to the SCR device 8 contains ammonia. The configuration of the mixing device 5 is described in detail below.

The SCR device 8 selectively reduces nitrogen oxides ($NO_x$) in the exhaust gas, and converts them to nitrogen ($N_2$) and water ($H_2O$). The SCR device 8 comprises a case 81 and a catalyst 82. The case 81 is cylindrical and houses the catalyst 82, with the outer circumferential surface of the catalyst 82 being in contact with the inner circumferential surface of the case 81. The catalyst 82 is a selective reduction catalyst in which a zeolite-based catalyst or a vanadium-based catalyst is supported on a carrier.

Figure 3:
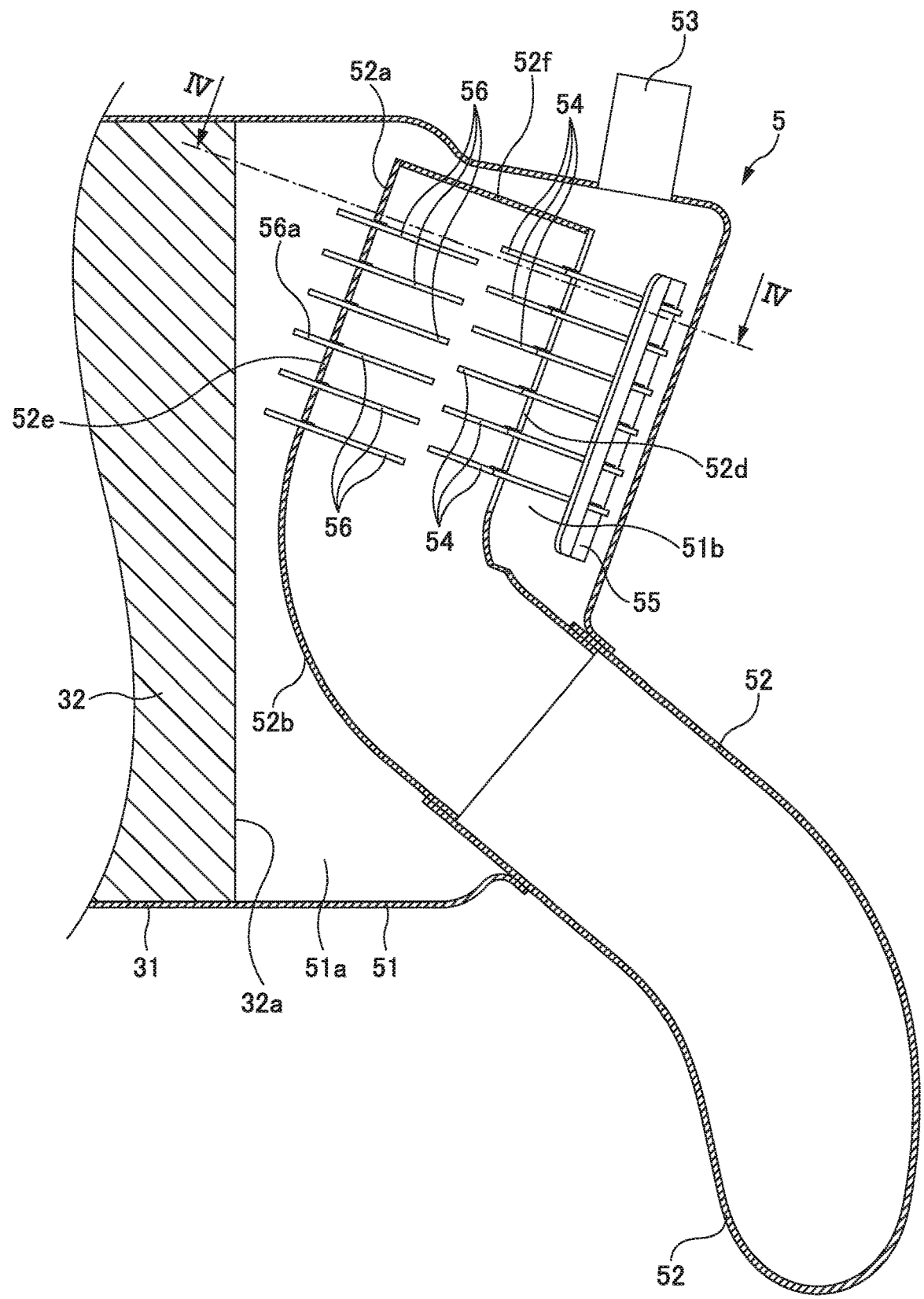
FIG. 3 depicts a vertical cross-sectional view of a mixing device.

The mixing device 5 is described in detail with reference to FIGS. 3 and 4. FIG. 3 depicts a vertical cross-sectional view of the mixing device 5, whereas FIG. 4 depicts a cross-sectional view along the plane illustrated in FIG. 3.

Figure 4:
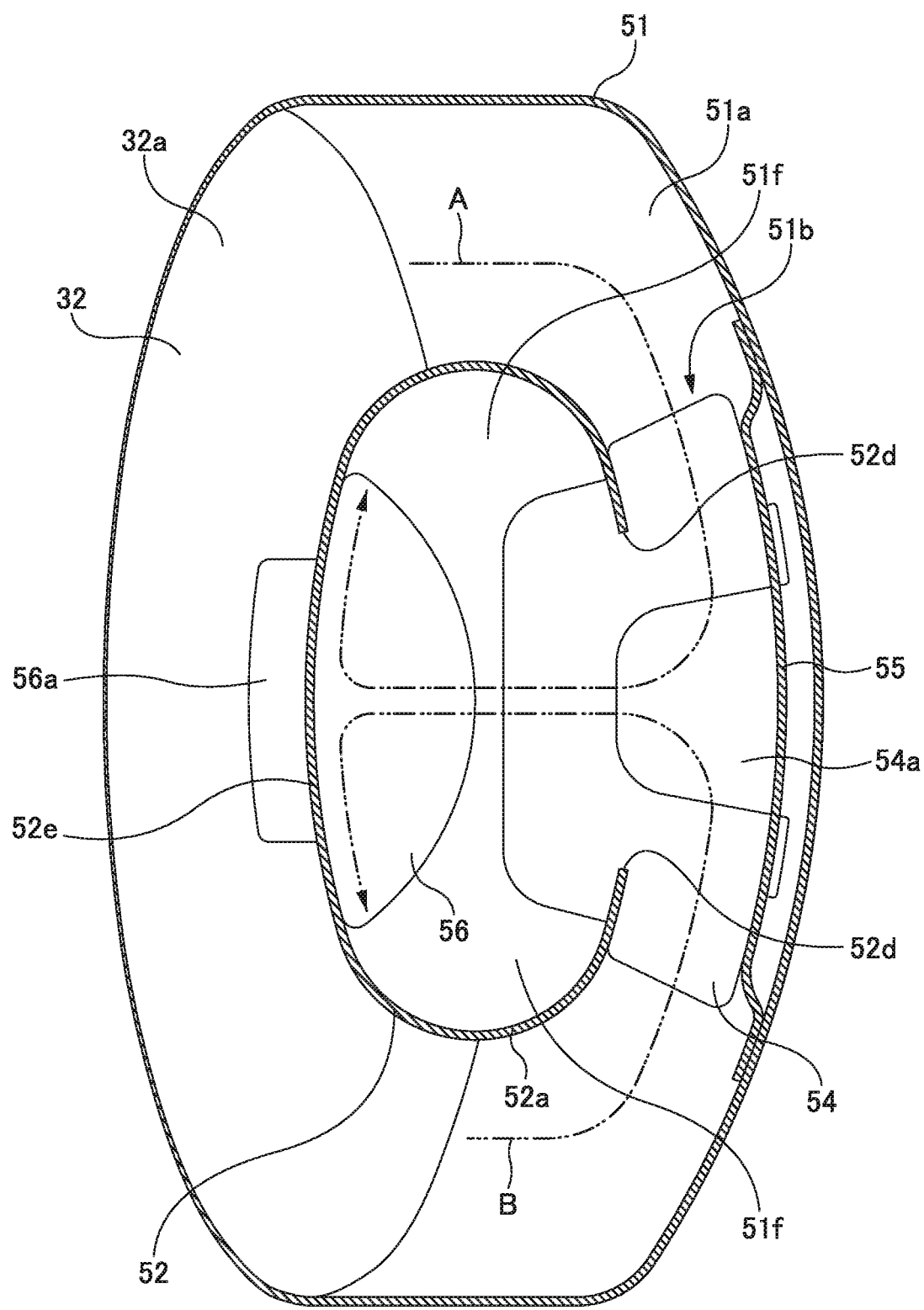
FIG. 4 depicts a cross-sectional view along the IV-IV line illustrated in FIG. 3.

As shown in FIGS. 3 and 4, the mixing device 5 comprises a case 51, an exhaust pipe 52, an injector 53, baffle plates 54, a support plate 55, and trapping plates 56. In FIG. 3, the case 31, the filter 32, the case 51, and the exhaust pipe 52 are depicted in a cutaway perspective along the vertical plane, whereas the injector 53, the baffle plates 54, the support plate 55, and the trapping plates 56 are depicted without any cutaway.

The case 51 expands out from the downstream end of the case 31 of the diesel particulate filter device 3, and a chamber 51a is formed inside the case 51. The case 51 may be integrally formed with the case 31 or assembled to or in the case 31. The case 31 surrounds a downstream end face 32a of the filter 32 of the diesel particulate filter device 3, and the downstream end face 32a of the filter 32 of the diesel particulate filter device 3 is exposed within the chamber 51a. Thus, the exhaust gas passing through the filter 32 is blown out through the downstream end face 32a of the filter 32 into the chamber 51a. The downstream end face 32a of the filter 32 corresponds to a blowing section. Henceforth, the orientation of the downstream end face 32a of the filter 32 is referred to as backward, and the opposite orientation is referred to as forward.

The exhaust pipe 52 is curved. A bent portion 52b and an upper portion (hereinafter referred to as an upper pipe segment) 52a of the exhaust pipe 52 are housed in the case 51, and a portion (hereinafter referred to as a lower pipe segment) 52c located below the bent portion 52b protrudes out from the case 51 and is connected to the case 81 of the SCR device 8. The upper pipe segment 52a is tilted backward relative to the vertical direction in the region facing the downstream end face 32a of the filter 32. In other words, the axis of the upper pipe segment 52a is inclined with respect to the vertical direction so that it approaches the downstream end face 32a of the filter 32 from top to bottom, with the bent portion 52b being closest to the downstream end face 32a of the filter 32 in the exhaust pipe 52. In turn, the lower pipe segment 52c is tilted forward relative to the vertical direction. In other words, the axis of the lower pipe segment 52c is inclined with respect to the vertical direction so that it is directed away from the downstream end face 32a of the filter 42 from top to bottom, with the bent portion 52b being farthest from the downstream end face 32a of the filter 32 in the exhaust pipe 52. The axis of the upper pipe segment 52a extends in the longitudinal direction of the upper pipe segment 52a, and the axis of the lower pipe segment 52c extends in the longitudinal direction of the lower pipe segment 52c.

The exhaust pipe 52 is heated by the exhaust gas blown out from the downstream end face 32a of the filter 32. Because the bent portion 52b of the exhaust pipe 52 is closest to the downstream end face 32a of the filter 32, the bent portion 52b is most easily heated.

The top end of the exhaust pipe 52 is closed by an end plate 52f. In FIGS. 1 and 2, the end plate 52f is omitted to facilitate the depiction of the inside of the exhaust pipe 52. The top end of the exhaust pipe 52 may be blocked by the ceiling surface of the chamber 51a.

An opening 52d is formed in the outer circumferential surface of the upper pipe segment 52a, facing away from the downstream end face 32a of the filter 32, i.e., the rear face of the upper pipe segment 52a. This opening 52d faces a direction opposite the downstream end face 32a of the filter 32. Because the outer circumferential surface of the upper pipe segment 52a is separated from the inner surface of the case 81, the exhaust gas blown out from the downstream end face 32a of the filter 32 passes through the side of the exhaust pipe 52, goes around the back of the exhaust pipe 52, and then flows through the opening 52d into the exhaust pipe 52, as shown by arrows A and B. The velocity of the exhaust gas increases as it passes through the opening 52d, causing the exhaust gas to hit a portion 52e of the inner circumferential surface of the upper pipe segment 52a. This portion 52e is located opposite to the opening 52d. This portion 52e is hereinafter referred to as the opposing portion 52e.

When the exhaust gas hits the opposing portion 52e, the flow of the exhaust gas splits into two circumferential directions along the inner circumferential surface of the exhaust pipe 52, as shown by the arrows A and B. Therefore, two helical flows swirling in opposite directions are generated inside the exhaust pipe 52. The exhaust gas moves through the two helical flows inside the exhaust pipe 52, toward the case 81 of the SCR device 8.

The cross-sectional shape of the exhaust pipe 52 along the plane perpendicular to its axial direction is elliptical, and the longitudinal diameter of it is parallel to the downstream end face 32a of the filter 32, so that two spiral flows are easily generated in the exhaust pipe 52. The elliptical shape described here is meant to include circles that have been squeezed on two sides, rectangles with rounded corners, and oval shapes.

The upper pipe segment 52a is spaced forward from the rear inner surface of the chamber 51a. Thus, a space 51b, which is part of the chamber 51a, is formed behind the upper pipe segment 52a. The lower pipe segment 52c is placed below this space 51b. Therefore, the exhaust gas that flows through the side of the exhaust pipe 52 and goes around the back of the exhaust pipe 52 is limited, thus increasing the velocity of the exhaust gas flowing into this space 51b.

The injector 53 is attached to the case 51 above the space 51b. The injector 53 is directed downward, i.e., toward an area faced by the opening 52d. The injector 53 has three injection nozzles, each of which injects an additive downwardly. To this end, three jet streams of additives are formed ahead of the injection points of the injector 53. Each of the jet streams widens as it moves downward from the injector 53, so that each jet stream is approximately conical in shape.

In the space 51b, the baffle plates 54 are provided at multiple levels and are spaced apart from each other in the axial direction of the upper pipe segment 52a. The baffle plates 54 are placed perpendicular to the axial direction of the upper pipe segment 52a. The rear end of each baffle plate 54 engages with the support plate 55. The support plate 55 is welded to the rear inner surface of the chamber 51a. In this way, the baffle plates 54 are attached to the inside of the case 51.

A portion of the baffle plate 54 protrudes through the opening 52d into the upper pipe segment 52a. The width of the baffle plate 54 located inside the exhaust pipe 52 is greater than that of the opening 52d. Likewise, the width of the baffle plate 54 located outside the exhaust pipe 52 is greater than that of the opening 52d. In turn, the width of the baffle plate 54 located inside the exhaust pipe 52 is smaller than that of the exhaust pipe 52. Therefore, space 51f is formed on both sides of the each baffle plate 54 located inside the exhaust pipe 52, when viewed in the axial direction of the upper pipe segment 52a as shown in FIG. 4. The spaces 51f contribute to the prevention of the impediment of the stream of the spiral flow.

A rectangular notch 54a is formed in each baffle plate 54. A portion of the jet stream injected by the injector 53 collides with the baffle plates 54, whereas another portion passes through the notches 54a. The position, size, and shape of each notch 54a are set so that the jet stream collides with all baffle plates 54 with a uniform flow rate.

When droplets of the additive(s) contained in the jet stream collide with the baffle plates 54, they are heated and can vaporize much more easily. The droplets colliding with the baffle plates 54 are broken up into multiple droplets, with droplets smaller than the colliding droplets bouncing back from the baffle plates 54. The bounced droplets also collide with the neighboring baffle plates 54 and are further broken up into smaller droplets. The increase in the number of times that the droplets bounce back facilitates their vaporization.

The bounced droplets are carried by the exhaust gas stream and enter the exhaust pipe 52 through the opening 52d. When the droplets collide with the opposing portion 52e, a liquid film of additive(s) is formed on the opposing portion 52e. The liquid film is heated directly by the exhaust pipe 52 and indirectly by the exhaust gas hitting the outer circumferential surface of the exhaust pipe 52, which vaporizes the additive(s).

As described above, the upper pipe segment 52a is tilted relative to the vertical direction. Thus, the liquid film formed on the opposing portion 52e is less likely to flow downward.

Therefore, the liquid film is heated for a longer period and the additive(s) is/are vaporized more easily.

To facilitate the retention of the liquid film formed on the opposing portion 52e in place, multiple trapping plates 56 are attached to the opposing portion 52e. These trapping plates 56 are provided so that they protrude from the opposing portion 52e into the upper pipe segment 52a and are perpendicular to the axial direction of the upper pipe segment 52a. These trapping plates 56 are provided at multiple levels and are spaced apart from each other in the axial direction of the upper pipe segment 52a. The trapping plates 56 are displaced from the baffle plates 54 in the axial direction of the upper pipe segment 52a, and the trapping plates 56 and the baffle plates 54 are arranged alternately in the axial direction of the upper pipe segment 52a. Therefore, the exhaust gas spiraling in the upper pipe segment 52a flows into the gaps between the trapping plates 56 and the gaps between the baffle plates 54, and the flow of the exhaust gas is not obstructed.

The trapping plates 56 do not overlap with the baffle plates 54 when viewed in the axial direction of the upper pipe segment 52a, as shown in FIG. 4. The width of each trapping plate 56 inside the exhaust pipe 52 is smaller than that of the exhaust pipe 52. Therefore, the space 51f is formed on both sides of the each trapping plate 56 located inside the exhaust pipe 52, when viewed in the axial direction of the upper pipe segment 52a as shown in FIG. 4. The space 51f contributes to the prevention of the impediment of the stream of the spiral flow.

The trapping plates 56 not only retain the liquid film formed on the opposing portion 52e, but also trap droplets in the exhaust gas. In other words, the droplets in the exhaust gas that have passed through the opening 52d collide with the trapping plates 56, resulting in the adhesion of the droplets to the surface of the trapping plates 56 or their entrance into the gaps located between the trapping plates 56, and their retention there. The trapping plates 56 also suppress the generation of splashing of the additive(s) caused by the exhaust gas hitting the opposing portion 52e.

The trapping plates 56 protrude outward from the exhaust pipe 52 through the opposing portion 52e. Therefore, the exhaust gas blown out from the downstream end face 32a of the filter 32 hits the trapping plates 56, which facilitates the heating of the trapping plates 56. Because the heat is conducted through the trapping plates 56 toward the inside of the exhaust pipe 52, the droplets colliding with the trapping plates 56 are heated, as is the liquid film adhering to the surface of each trapping plate 56. Therefore, the additive(s) is/are easily vaporized. The portion of the trapping plate 56 that protrudes outside the exhaust pipe 52 is referred to as a protruding portion 56a.

The structure of the mixing device 5 was described in detail above. The merits and advantageous effects of the mixing device 5 are summarized in points (1) through (7), as follows.

(1) Droplets injected by the injector 53 collide with the baffle plates 54 and are broken up into smaller droplets, which facilitates the vaporization of the droplets.

(2) Because the droplets of the additive(s) move in the exhaust pipe 52 on the spiral flow of the exhaust gas, the droplets contact the exhaust pipe 52 by centrifugal force. Therefore, the droplets are more likely to vaporize.

(3) The liquid film of the additive(s) formed on the opening 52d and the opposing portion 52e of the inner circumferential surface of the exhaust pipe 52 tends to remain on the opposing portion 52e because the upper pipe segment 52a is tilted relative to the vertical direction, and because the trapping plates 56 are attached to the opposing portion 52e. The opposing portion 52e is easily heated by the exhaust gas blown out through the downstream end face 32a of the filter 32, and the liquid film adhering to the opposing portion 52e are more likely to vaporize.

(4) Even if the liquid film of the additive(s) adhering to the opposing portion 52e flows downward along the inner surface of the upper pipe segment 52a, the direction of the flow changes at the bent portion 52b. Therefore, the liquid film of the additive(s) tends to remain in the bent portion 52b. The bent portion 52b is most easily heated by the exhaust gas blown out through the downstream end face 32a of the filter 32; hence, the liquid film held in the bent portion 52b is more likely to vaporize.

(5) Because the protruding portion 56a of each trapping plate 56 protrudes toward the downstream end face 32a of the filter 32 at a position located outside the exhaust pipe 52, the trapping plate 56 is easily heated. Therefore, the additive(s) adhering to the trapping plate 56 is/are more likely to vaporize.

(6) Because the additive(s) is/are more likely to vaporize, as described in points (1) through (5), the additive(s) is/are easily decomposed into ammonia, and nitrogen oxides are easily reduced in the SCR device 8. The resulting ammonia is uniformly mixed into the exhaust gas by the spiral flow in the exhaust pipe 52.

(7) Because the additive(s) is/are more likely to vaporize, as described in points (1) through (5), and the liquid film of the additive(s) tends to remain on the opposing portion 52e and the bent portion 52b, a liquid film of the additive(s) is less likely to form on regions other than the opposing portion 52e and the bent portion 52b. Therefore, it is possible to suppress the formation of additive precipitates at unexpected positions. Obstruction of the exhaust pipe 52 can also be prevented.

The above description of several embodiments is intended to facilitate understanding of the present invention, and the present invention should not be construed as limited to the aforementioned embodiments. The embodiments may be changed and improved without departing from the spirit thereof. Changes from the above embodiments are described below.

Figure 5:
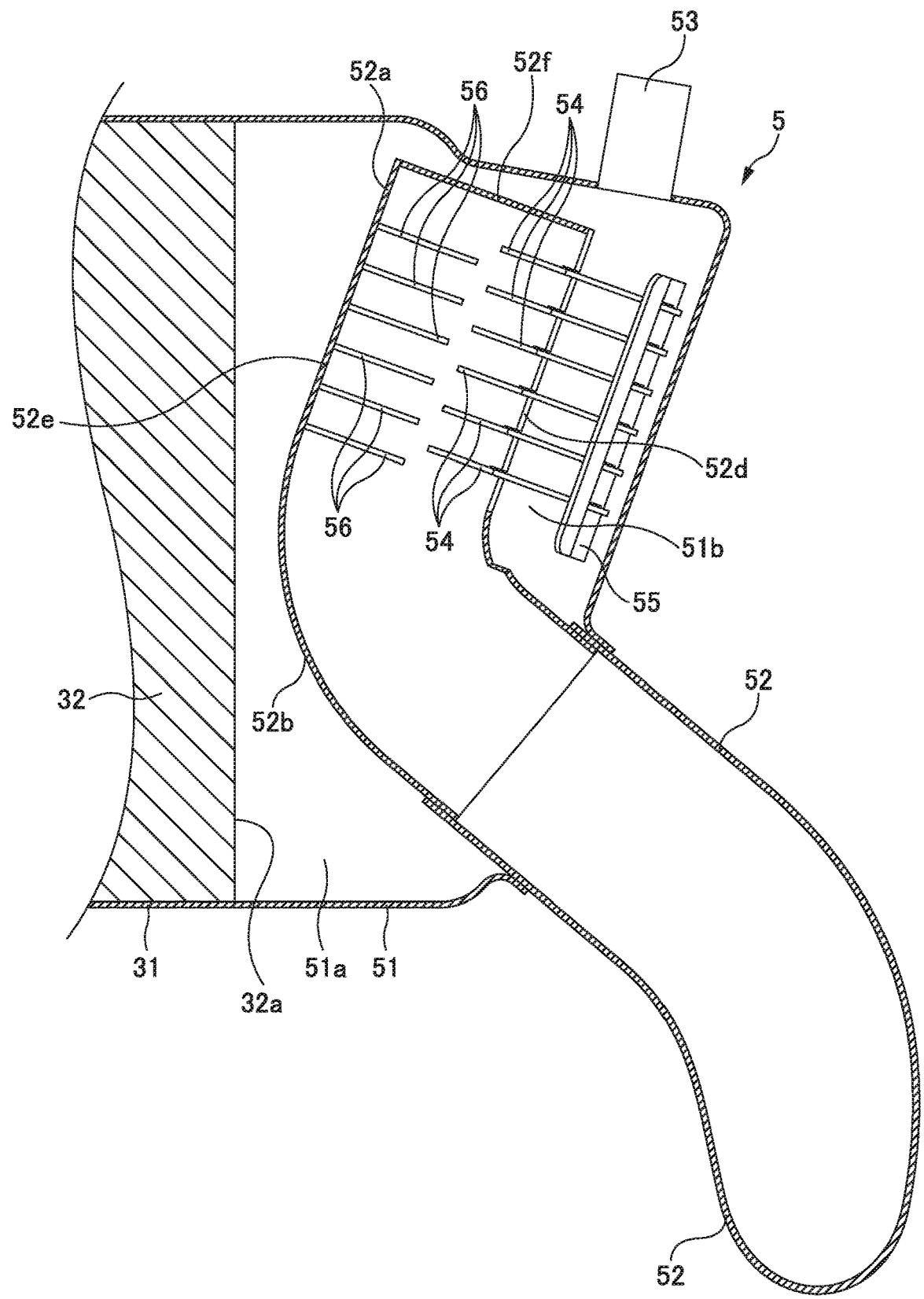
FIG. 5 depicts a vertical cross-sectional view of a mixing device of a first modified embodiment.

(1) In the above embodiment, the protruding portion 56a of each trapping plate 56 protrudes toward the downstream end face 32a of the filter 32 in a place located outside the exhaust pipe 52. In contrast, as shown in FIG. 5, such protruding portion 56a may be omitted.

Figure 6:
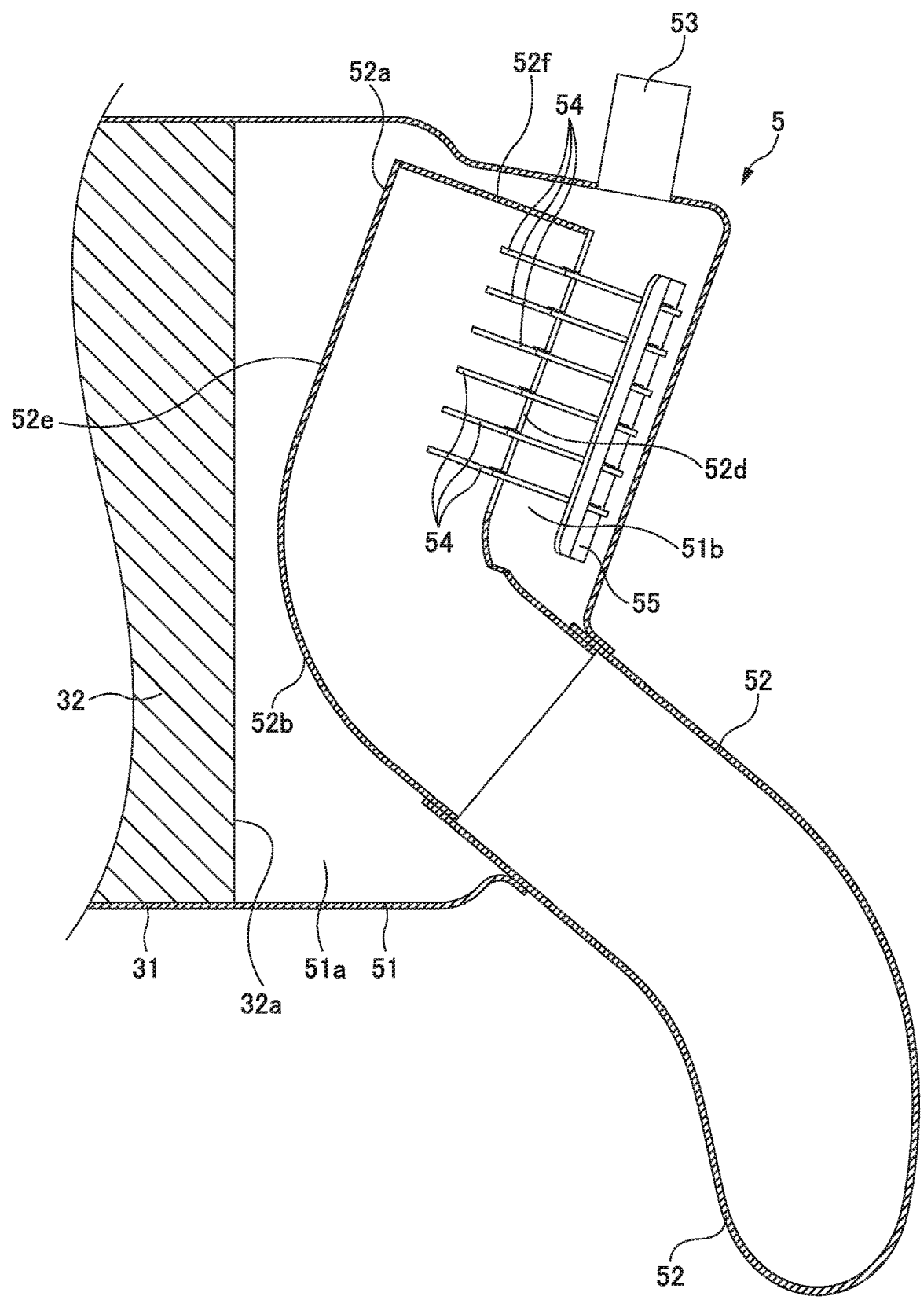
FIG. 6 depicts a vertical cross-sectional view of a mixing device of a second modified embodiment.

(2) In the above embodiment, the trapping plates 56 are provided on the opposing portion 52e. In contrast, as shown in FIG. 6, such trapping plates 56 may be omitted.

(3) The trapping plates 56 are plate-shaped. In contrast, a rod-shaped, needle-shaped, spiral-shaped or mesh-shaped trapping members may be attached, protruding from the opposing portion 52e into the exhaust pipe 52.

(4) Porous or fibrous material may be provided on the opposing portion 52e instead of the metal trapping plates 56. The opposing portion 52e itself may be made of a porous or fiber material. Even if a porous or fibrous material is employed, the generation of splashing of the additive(s) caused by the exhaust gas hitting the opposing portion 52e can be suppressed.

(5) In the above embodiment, the device located upstream of the mixing device 5 is the diesel particulate filter device 3. In contrast, instead of the diesel particulate filter device 3, the diesel oxidation catalyst device may be provided upstream of the mixing device 5, and the diesel oxidation catalyst may be housed in the case 31 instead of the filter 32.

DENOTATION OF SYMBOLS

5 . . . MIXING DEVICE
32 . . . FILTER
51 . . . CASE
52 . . . EXHAUST PIPE
52*a* . . . UPPER PIPE SEGMENT
52*b* . . . BENT PORTION
52*c* . . . LOWER PIPE SEGMENT
52*d* . . . OPENING
52*e* . . . OPPOSING PORTION
53 . . . INJECTOR
54 . . . BAFFLE PLATES
56 . . . TRAPPING PLATES

The invention claimed is:

1. A mixing device comprising:

a case surrounding a blowing section, through which an exhaust gas is blown out, of a filter or a catalyst;

an upper pipe segment having an opening formed therein, the opening facing away from the blowing section, the upper pipe segment being tilted relative to the vertical direction so that the more the upper pipe segment goes vertically downward, the closer it gets to the blowing section in a region facing the blowing section within the case;

a lower pipe segment bent from a lower end of the upper pipe segment, the lower pipe segment being tilted relative to the vertical direction so that the more the lower pipe segment goes vertically downward, the further away it gets from the blowing section, the lower pipe segment extending out from the case and being connected to a selective catalytic reduction device;

an injector attached to the case, the injector injecting a liquid additive toward an area faced by the opening, the area being located outside the upper pipe segment in the case; and a trapping section provided on an inner surface of the upper pipe segment at an opposing position of the opening and extending from the opposing position into the upper pipe segment, the trapping section trapping droplets of the additive, wherein the trapping section comprises plate-shaped, rod-shaped, needle-shaped, spiral-shaped or mesh-shaped trapping members.

2. The mixing device according to claim 1, wherein the trapping section passes through the opposing position to the outside of the upper pipe segment.

3. The mixing device according to claim 1, wherein the trapping section comprises trapping plates provided at multiple levels, the trapping plates being spaced apart from each other in an axial direction of the upper pipe segment.

4. The mixing device according to claim 3, further comprising baffle plates provided at multiple levels in the area faced by the opening, the area being located outside the upper pipe segment in the case, the baffle plates being spaced apart from each other in an axial direction of the upper pipe segment;

the baffle plates and the trapping plates being arranged alternately in an axial direction of the upper pipe segment.

* * * * *